UNITED STATES PATENT OFFICE.

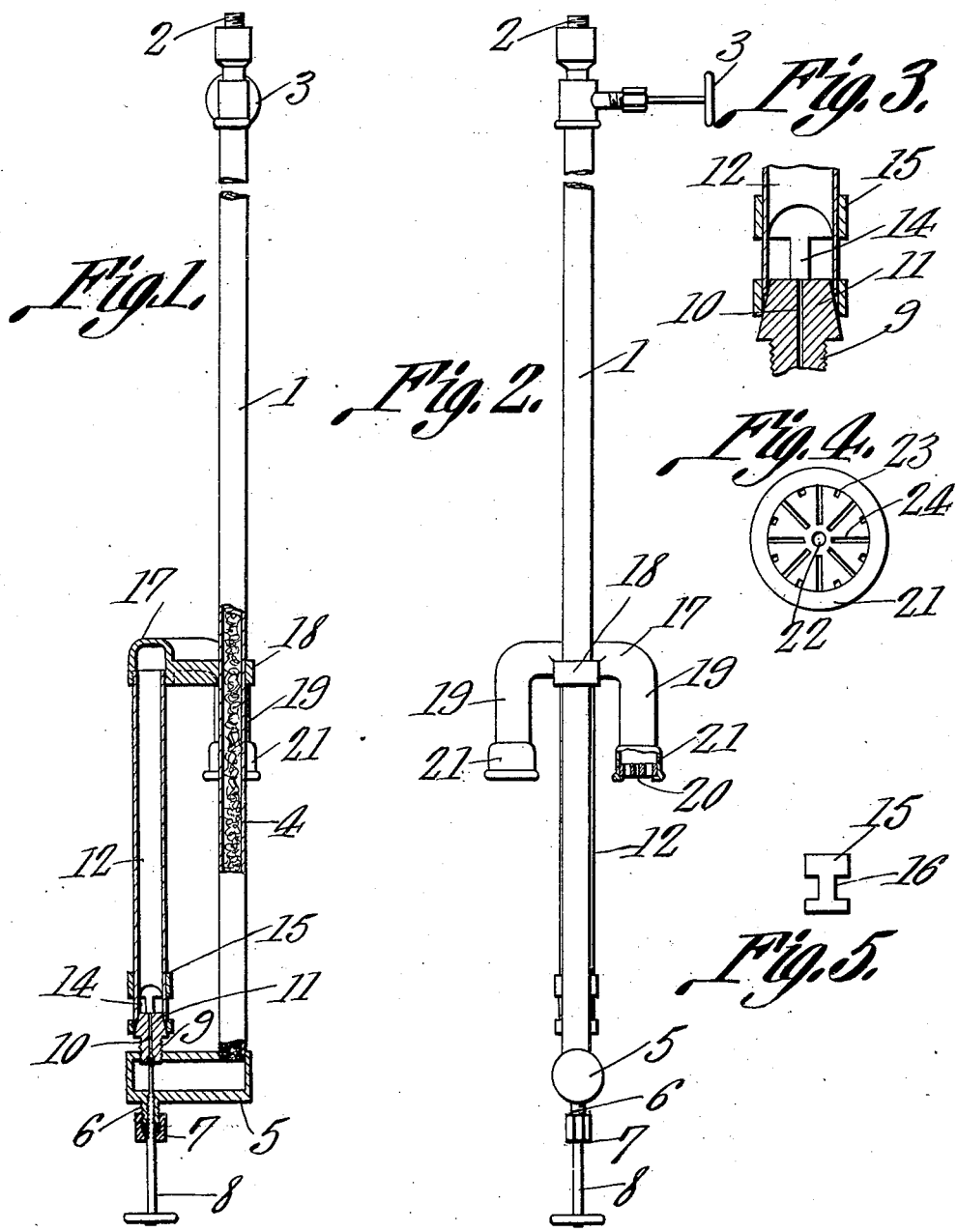

HENRY C. ALBRECHT, OF TERRE HAUTE, INDIANA.

GASOLENE-LAMP.

991,815.  Specification of Letters Patent.  Patented May 9, 1911.

Application filed August 3, 1910. Serial No. 575,257.

*To all whom it may concern:*

Be it known that I, HENRY C. ALBRECHT, a citizen of the United States, residing at Terre Haute, in the county of Vigo and State of Indiana, have invented a new and useful Gasolene-Lamp, of which the following is a specification.

It is the object of this invention to provide a burner so constructed that the inlet of fuel thereto, the passage of gas into the mixing tube, and the admixture of gas and air, previous to combustion, may be accurately controlled.

Another object of the invention is to provide novel means for assembling the mixing tube with the remaining portions of the structure, and to provide novel means for mounting both the mixing tube and the air controlling valve which is carried thereby.

Another object of the invention is to improve generally, devices of the class above mentioned, and to provide novel means for assembling and connecting the constituent parts thereof.

The drawings show typical embodiments merely, and changes, properly falling within the scope of what is claimed, may be made without departing from the spirit of the invention.

In the drawings,—Figure 1 is a side elevation, parts being broken away; Fig. 2 is a rear elevation; Fig. 3 is a sectional detail enlarged from Fig. 1; Fig. 4 is a bottom plan of one of the burner plates and of the means whereby the same is immediately retained in place; and Fig. 5 is a side elevation of the thimble whereby the influx of air is controlled.

A vaporizing tube 1 is disposed in upright position, and provided at its upper end with a connection 2, whereby the vaporizing tube may be connected with a source of liquid fuel supply. In the upper end of the vaporizing tube 1 there is a fuel-controlling valve 3. The vaporizing tube 1 is preferably filled with asbestos 4, to retard the flow of liquid fuel through the vaporizing tube.

The lower end of the vaporizing tube 1 is mounted in a casing 5. This casing 5 is provided adjacent one end and upon its lower portion, with a nipple 6, carrying a cap 7, a needle valve 8 being threaded into the nipple 6, and movable in the cap 7.

Into the opposite face of the casing 5, a plug 9 is threaded, or otherwise mounted. This plug 9 is provided with a port 10 which the needle valve 8 is adapted to close. The plug 9 is provided at its upper end with a tapered head 11, and upon this tapered head 11, a mixing tube 12 is adapted to be wedged. The mixing tube 12 is provided adjacent its base, with a series of openings 14, whereby air may be admitted to the mixing tube.

Rotatably mounted upon the mixing tube 12, is a thimble 15, having openings 16 adapted to be brought into alinement with the openings 14 in the mixing tube 12. These openings 16 in the thimble 15 may likewise be moved out of alinement with the openings 14 in the mixing tube 12, whereby these openings 14 may be wholly or partially closed, thus regulating the inflow of air to the mixing tube. The thimble 15 is not only rotatable upon the mixing tube 12, but, as well, slidable thereon, so that the thimble 15 may be slid downwardly, and wedged upon the tapered head 11 of the plug 9. Thus, the thimble 15 may be held against rotation upon the mixing tube 12, and when the openings 16 in the thimble are properly adjusted with respect to the openings 14 in the mixing tube 12, the thimble 15 may be held, in the manner hereinbefore described, against rotation, the holding of the thimble against rotation obviously serving to prevent the adjustment between the openings 14 and 16, from being altered.

Mounted upon the upper end of the mixing tube 12, is a burner 17. This burner 17 is a U shaped structure, provided in its intermediate portion with a bracket 18, adapted to inclose the vaporizing tube 1, and to slide thereon. The depending arms 19 of the burner 17 are terminally provided with enlarged heads 21, adapted to retain the burner plates 20 in place. Each burner plate 20 is provided with a central opening 22, with a plurality of peripheral openings 23, and with radially disposed, elongated openings 24.

It will be seen that when the fuel-controlling valve 3 is opened, the liquid fuel will pass downwardly into the vaporizing tube 1 and be converted into gas, which gas will enter the casing 5, pass through the port 10, and be mingled with air at the base of the mixing tube 12, the air entering the mixing tube 12, as hereinbefore pointed out, through the openings 14. The resulting mixture will find its way through the openings 22, 23 and 24 in the burner plates 20, at which burner plates, combustion will take place. The plurality of openings in the burner plates 20, and their peculiar disposition therein, result in a thorough and effective combustion, rendering the light furnished by the device, of a brilliant character.

When it is desired to extinguish the light, the needle valve 8 may be manipulated, whereupon the lamp will be immediately extinguished. If the fuel controlling valve 3, alone, is relied upon as a means for extinguishing the lamp, it will be seen that the lamp would burn for a considerable period of time after the fuel-controlling valve were closed; this fact resulting from the amount of liquid fuel which remains in the vaporizing tube 1, below the fuel-controlling valve 3, after the fuel-controlling valve 3 has been closed.

As pointed out hereinbefore, the mixing tube 12 may readily and quickly be assembled with the plug 9, the plug 9 likewise serving as a means for holding the thimble 16 against rotation, thereby to regulate the mixture of air and gas in the mixing tube 12.

Having thus described the invention, what is claimed is:—

In a device of the class described, a casing; a tapered plug inserted into the casing and provided with an outlet port; a needle valve mounted in the casing and adapted to seat in the port; a mixing tube provided with air-inlets and wedged upon the tapered plug; and a closure for the air inlets, rotatable upon the mixing tube and slidable thereon to be wedged against rotation, upon the tapered plug.

In testimony that I claim the foregoing as my own, I have hereto affixed my signature in the presence of two witnesses.

HENRY C. ALBRECHT.

Witnesses:
IRA D. ANDREWS,
CLYDE W. ANDREWS.

Copies of this patent may be obtained for five cents each, by addressing the "Commissioner of Patents, Washington, D. C."